(12) United States Patent
Suzuki et al.

(10) Patent No.: US 9,182,249 B2
(45) Date of Patent: Nov. 10, 2015

(54) ROTATION ANGLE DETECTION DEVICE

(75) Inventors: Keigo Suzuki, Kanagawa (JP); Masaki Hiei, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 127 days.

(21) Appl. No.: 13/983,955

(22) PCT Filed: Feb. 14, 2012

(86) PCT No.: PCT/JP2012/053338
§ 371 (c)(1),
(2), (4) Date: Aug. 6, 2013

(87) PCT Pub. No.: WO2012/111646
PCT Pub. Date: Aug. 23, 2012

(65) Prior Publication Data
US 2013/0314079 A1 Nov. 28, 2013

(30) Foreign Application Priority Data
Feb. 15, 2011 (JP) ................... 2011-030019

(51) Int. Cl.
*G01B 7/30* (2006.01)
*G01D 5/14* (2006.01)
(52) U.S. Cl.
CPC ..................... *G01D 5/145* (2013.01)
(58) Field of Classification Search
CPC ....... G01D 5/145; G01D 5/142; G01D 5/147; G01B 7/30
USPC .................................................... 324/207.25
See application file for complete search history.

(56) References Cited

U.S. PATENT DOCUMENTS

| 8,884,611 B2 * | 11/2014 | Hunger ...................... 324/207.2 |
| 2008/0265877 A1 | 10/2008 | Kato et al. |
| 2009/0146651 A1 * | 6/2009 | Hatanaka et al. ......... 324/207.25 |
| 2010/0001721 A1 * | 1/2010 | Inotsuka et al. ......... 324/207.25 |

FOREIGN PATENT DOCUMENTS

| JP | 2007-263585 A | 10/2007 |
| JP | 2008-292466 A | 12/2008 |
| JP | 2009-109274 A | 5/2009 |

* cited by examiner

*Primary Examiner* — Son Le
(74) *Attorney, Agent, or Firm* — Paul F. Neils, Esq.; Edwards Neils PLLC

(57) ABSTRACT

A rotation angle detection device capable of obtaining a detection result in a wider angle range with high accuracy. The rotation angle detection device is provided with a part to be detected which is attached to a throttle shaft S by a rotor, and a Hall IC which detects magnetic flux components of the part to be detected. The Hall IC is provided with a magnetism collecting plate which is disposed facing the part to be detected and extends along the rotation surface of the part to be detected, and Hall elements which detect the magnetic flux components of the part to be detected, and output a signal corresponding to the rotation position of the throttle shaft S on the basis of the results of the detection by the Hall elements. The Hall elements each detect a magnetic flux component in an X-axis direction passing through the rotation axis of the throttle shaft S. The Hall elements each detect a magnetic flux component in the Y-axis direction passing through the rotation axis of the throttle shaft S. The part to be detected is configured by combining a semicircular yoke with a semiannular magnet.

3 Claims, 20 Drawing Sheets

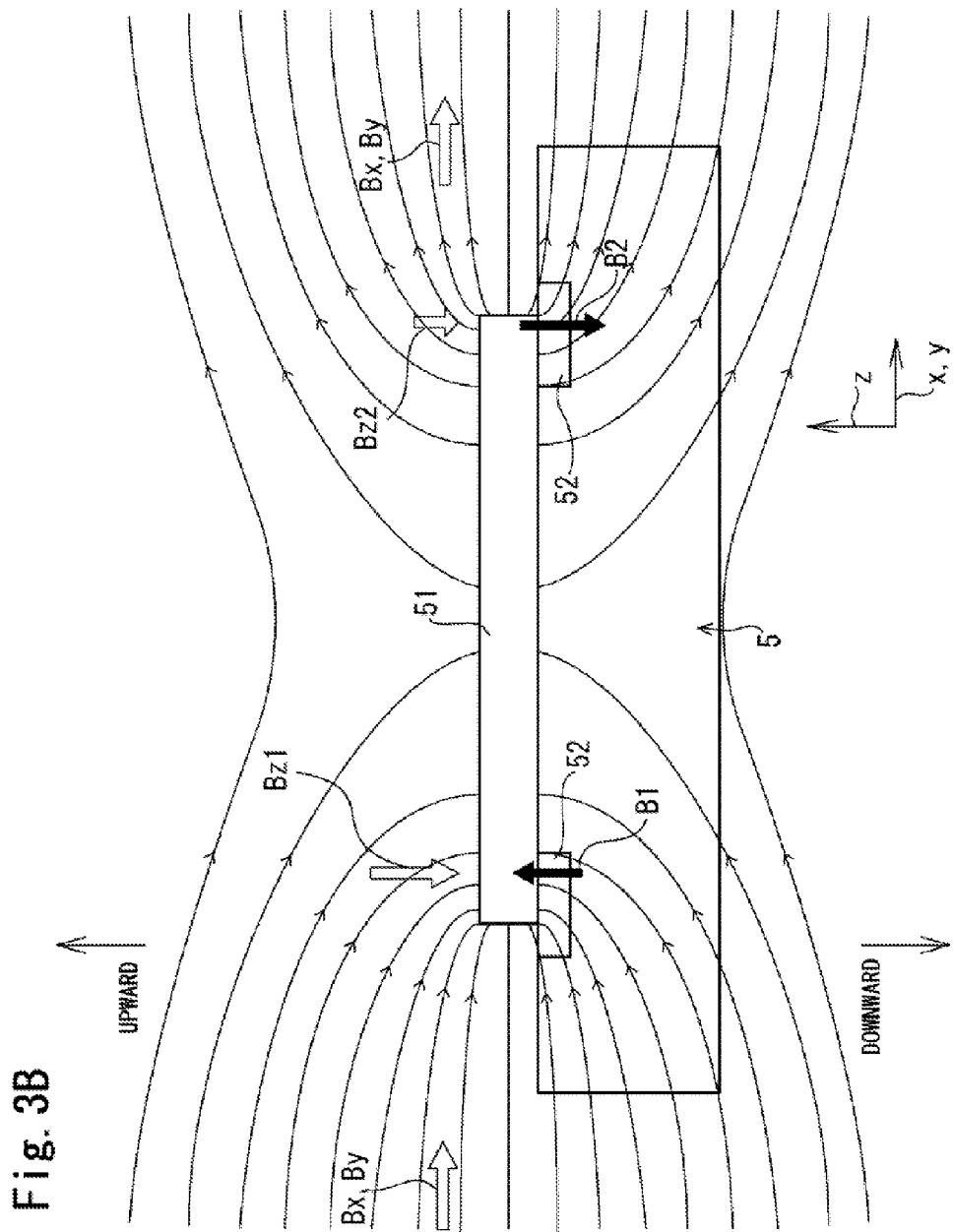

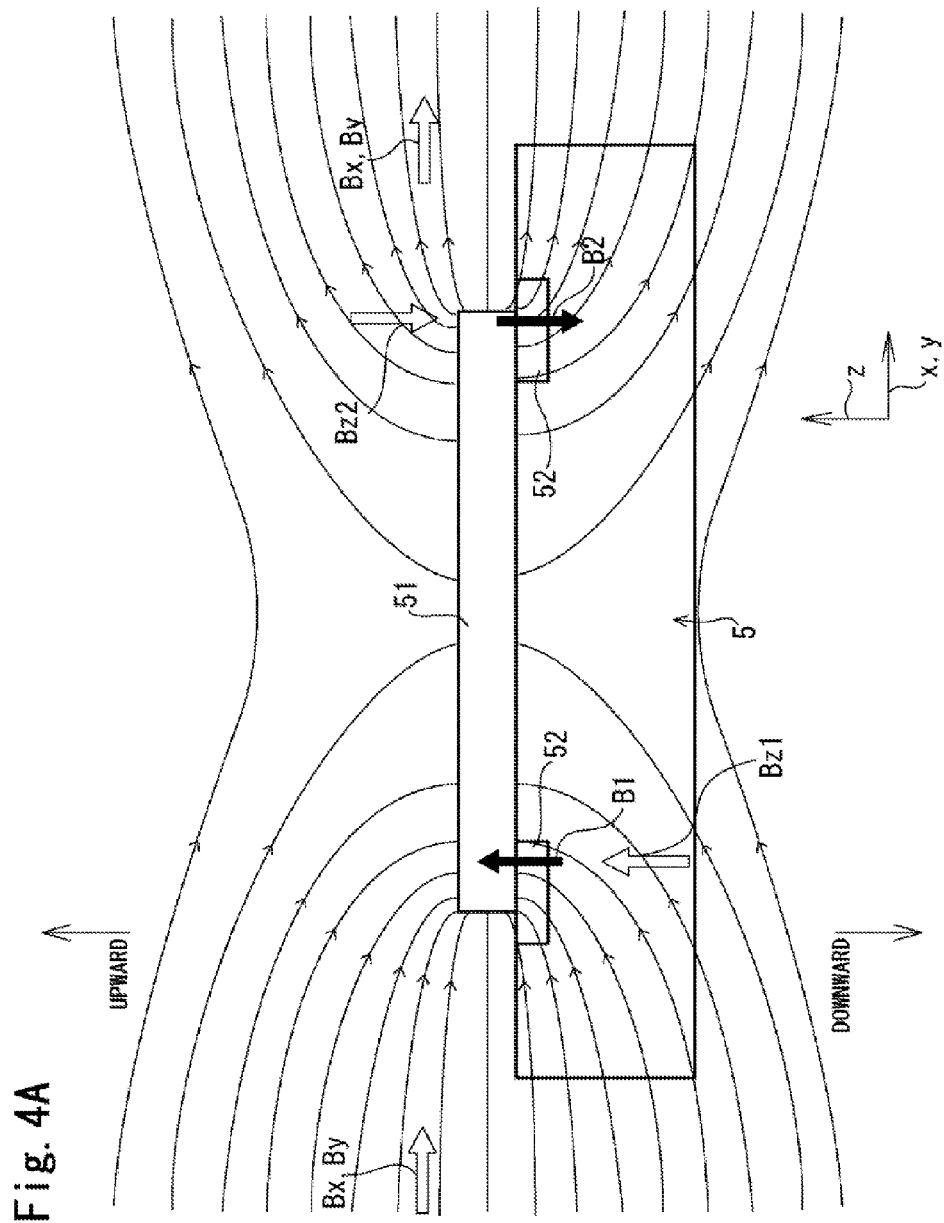

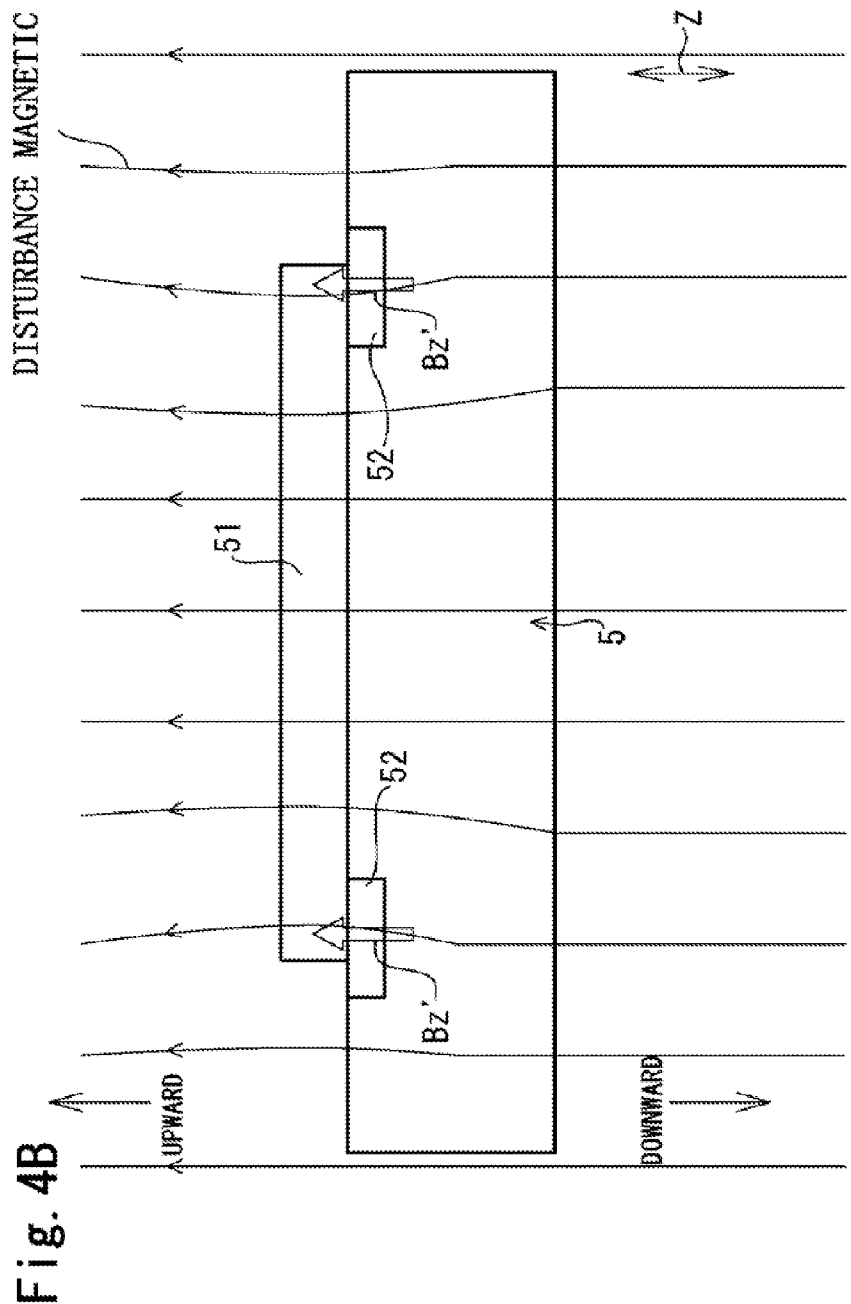

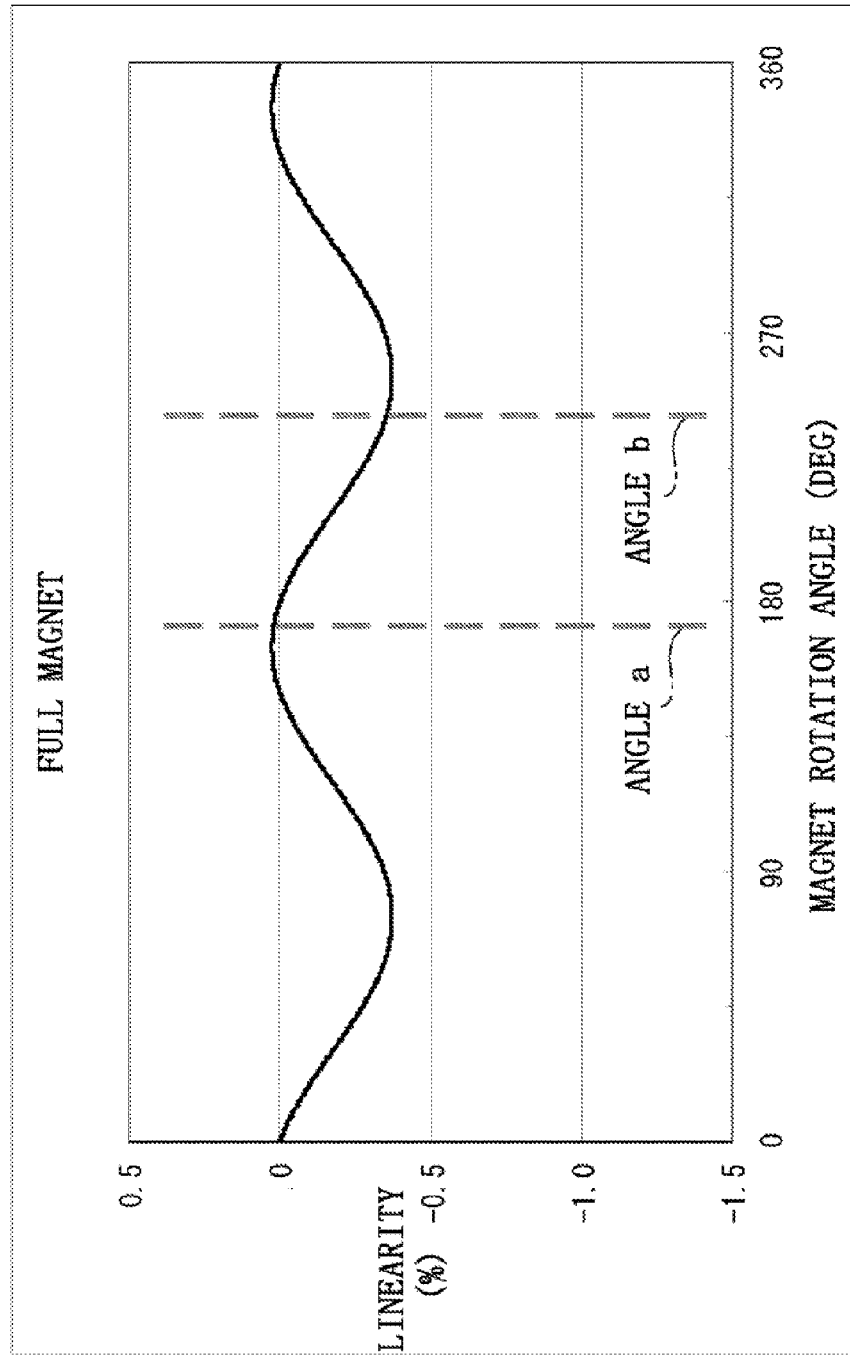

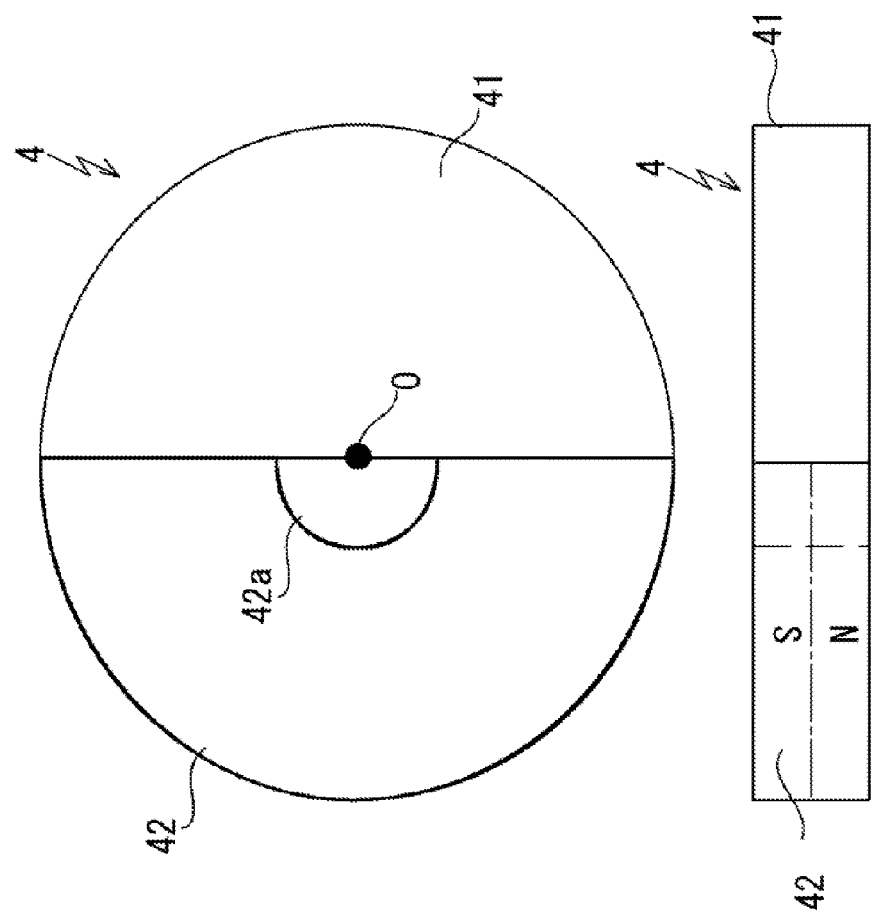

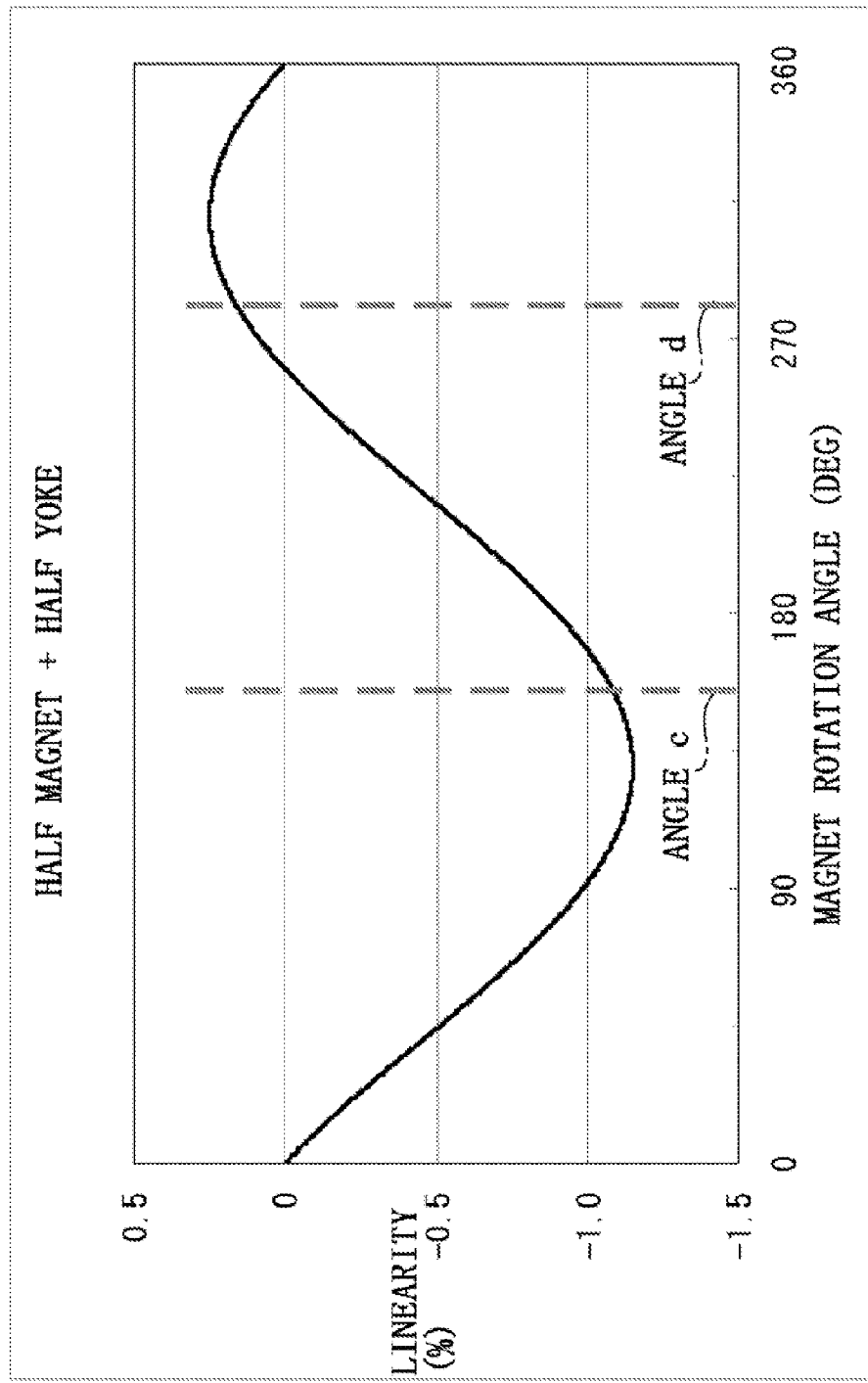

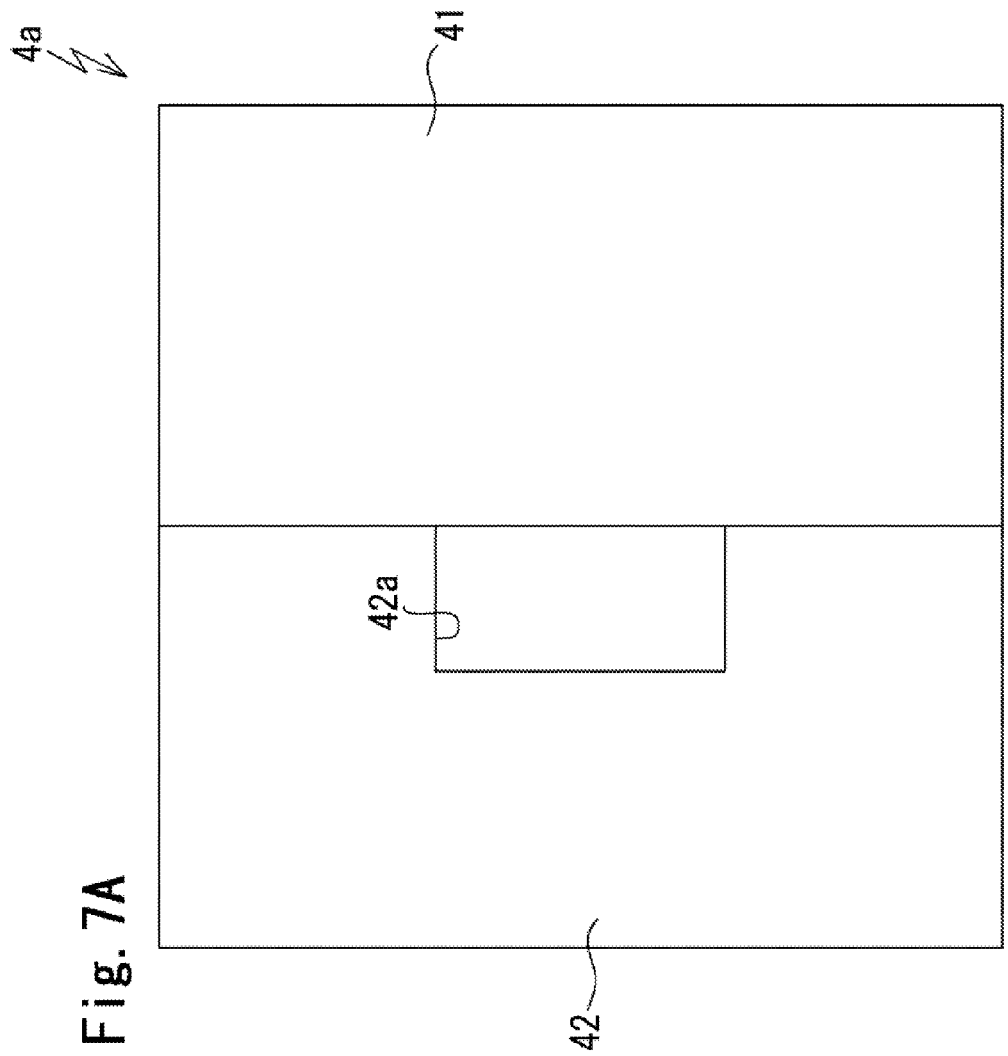

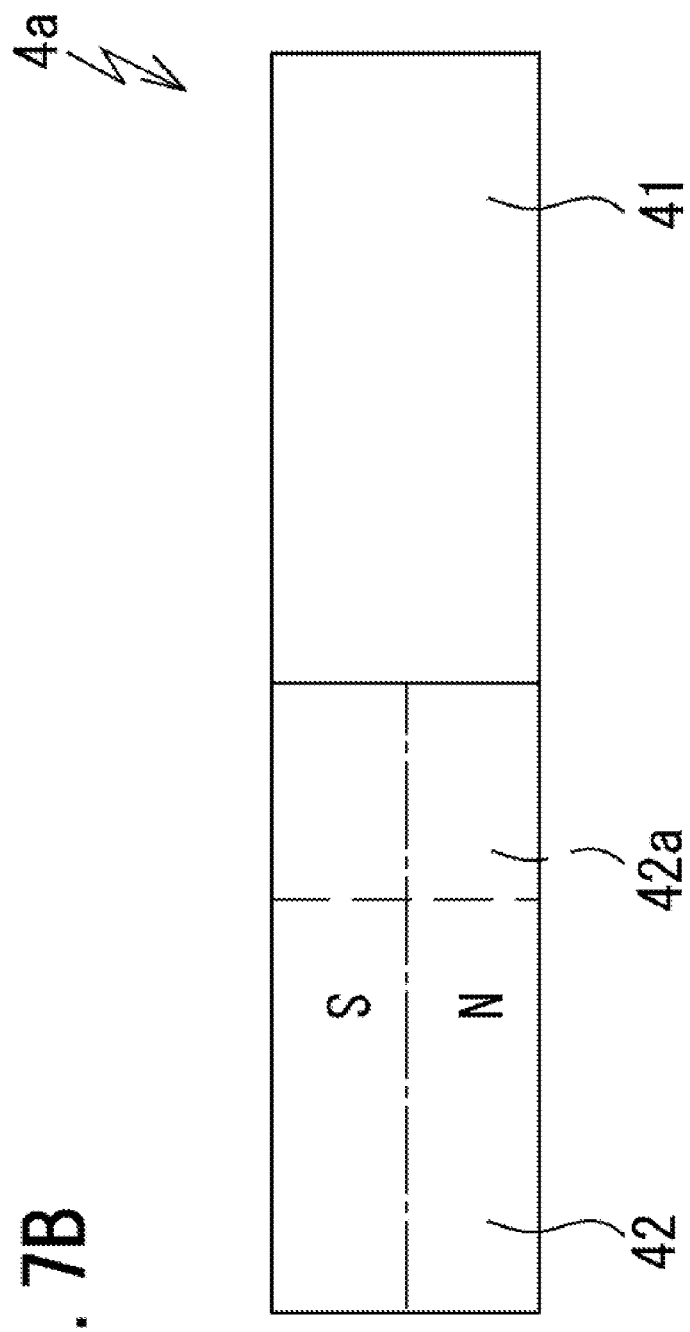

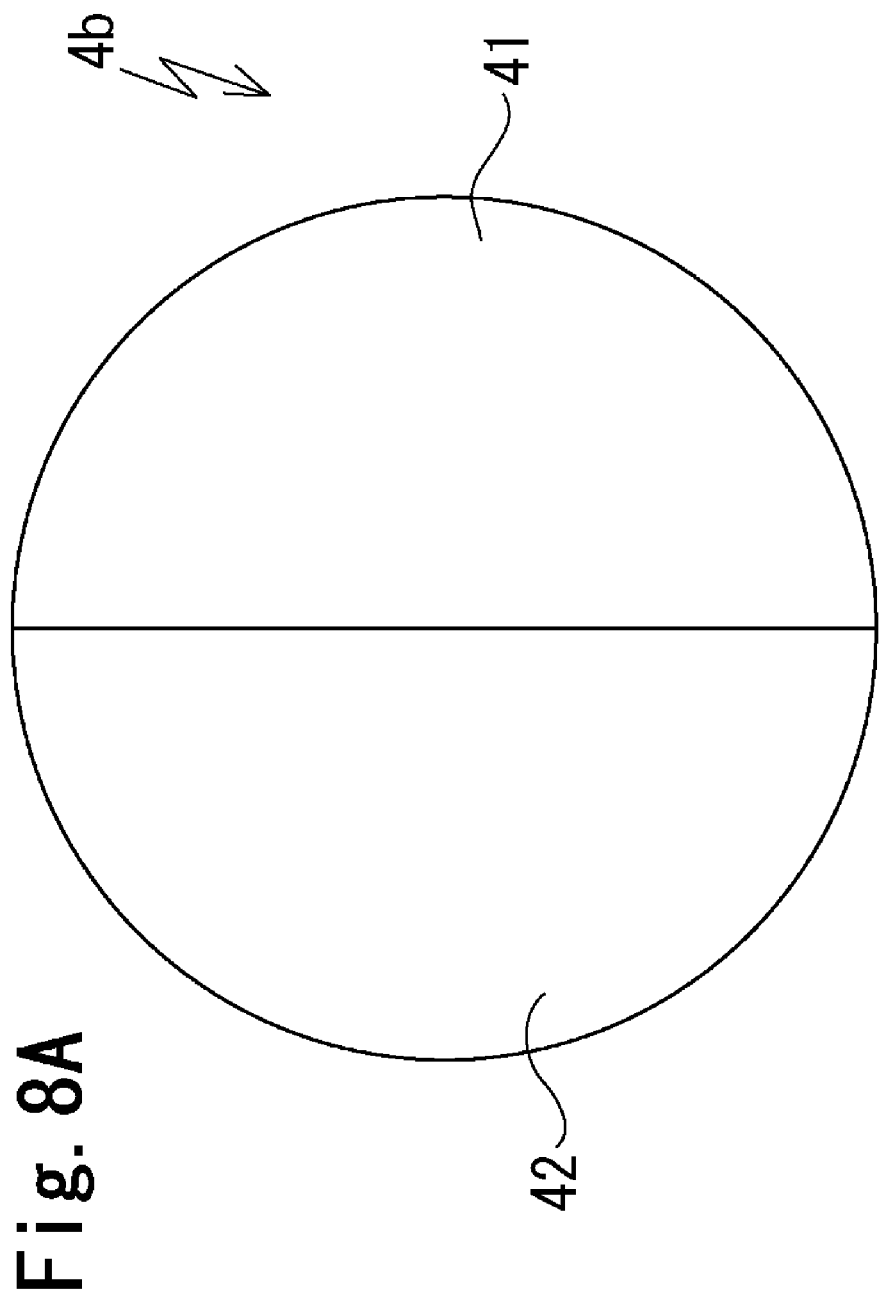

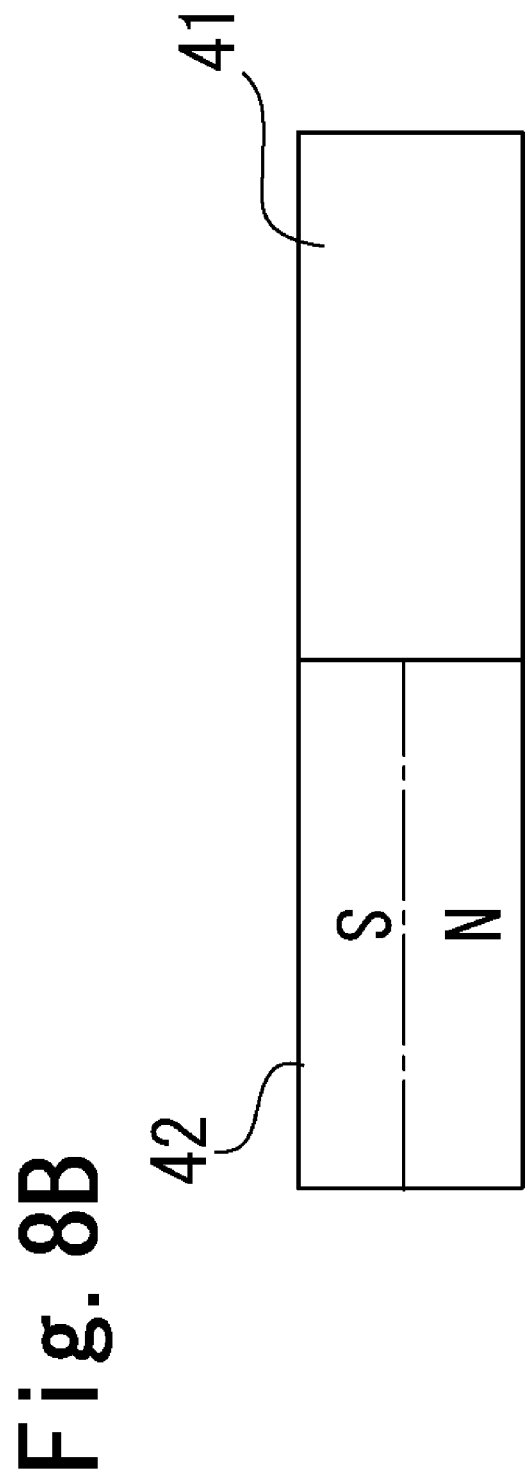

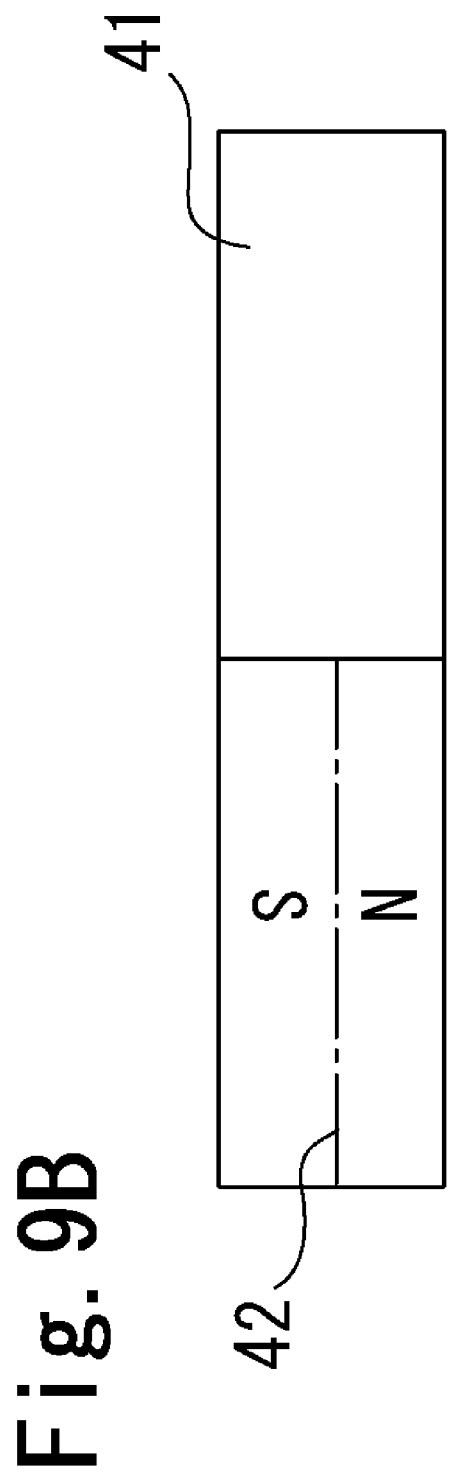

ROTATION ANGLE DETECTION DEVICE

CROSS-REFERENCE TO RELATED APPLICATIONS

The present invention is a 35 U.S.C. 371 National Stage Entry of PCT/JP2012/053338, filed Feb. 14, 2012, which claims priority from Japanese Patent Application No. 2011-030019, filed on Feb. 15, 2011, the contents of all of which are herein incorporated by reference in their entirety.

TECHNICAL FIELD

The present invention relates to a rotation angle detection device which uses magnetism sensing elements disposed on detection axes for detecting a magnetic field generated from a part to be detected, and on the basis of a result of detection by the respective magnetism sensing elements, identifies a rotation position of the part to be detected.

BACKGROUND ART

This type of rotation angle detection device is disclosed in the following Patent Documents 1 and 2. The rotation angle detection device disclosed in Patent Document 1 includes a magnet which is annularly formed, and into which a shaft is inserted, and magnetic sensors (detection elements) which are disposed on the axial lines extending orthogonally to each other from the rotation center of the shaft along the rotation surface of the magnet. The angle detection device disclosed in Patent Document 2 includes a rotation member which is annularly formed, and into which a shaft is inserted; a magnetic plate which is disposed faced to the outer peripheral surface of the rotation member; and detection elements which are disposed on the axial lines extending orthogonally to each other on the magnetic plate in an axial direction and a radial direction of the shaft. With these devices, the rotation angle of the shaft which is rotated integrally with the magnet and the rotation member is identified on the basis of a change in magnetism which has been detected by the respective detection elements. Specifically, the rotation angle is detected on the basis of the ratio between the magnetic flux densities which have been detected by the detection elements disposed on the axial lines (X-axis and Y-axis). This detection result is outputted after having been transformed so as to provide a linear change in proportion to the rotation angle.

Patent Document 1: Japanese Unexamined Patent Application Publication No. 2007-263585

Patent Document 2: Japanese Unexamined Patent Application Publication No. 2008-292466

Problems to be Solved by the Invention

In Patent Document 1, there is disclosed a configuration in which a yoke is disposed on the other side of a magnet that is opposite to one side of the magnet where the magnetic sensors are placed, and the magnet is magnetized in the axial direction, thereby the magnetic force in the axial direction being enhanced to minimize the effect of a disturbance magnetic field in the axial direction. In addition, in Patent Document 2, there is disclosed a configuration in which the difference in output voltage between the pair of detection elements is computed to detect the magnetic flux, thereby eliminating the effect of the disturbance magnetic field in the axial direction (so-called the Z-axis direction). The rotation angle detection device disclosed in Patent Document 2 performs a differential operation on the detection signals from the pair of magnetic sensors to detect (differentially detect) the angle. By performing differential detection, the effect of the disturbance magnetic field in the axial direction (the Z-axis direction) can be physically suppressed, thereby the so-called noise at the time of angle detection being suppressed. Therefore, the scheme in Patent Document 2 is effective for improving the detection accuracy. However, due to such a cause as a variation in characteristics between the magnetic sensors (the detection elements) disposed on the respective axial lines, the detection result outputted from the rotation angle detection device has an undulation as shown in FIG. 5(b). In order to detect the rotation angle using the rotation angle detection device having such a characteristic, it is necessary to detect the rotation angle outside of the range in which such an undulation is produced, and thus detection can be carried out only in a narrow rotation angle range which provides a linear region of this characteristic.

In view of the above problem, it is an object of the present invention to provide a rotation angle detection device which relates to an angle detecting method for detecting the rotation angle by differential detection, and which widens the rotation angle range assuring the linearity in the output, and thus allows accurate detection of the rotation angle in a wider rotation range.

Means for Solving the Problem

In order to solve such a problem, in one aspect of the present invention, there is provided a rotation angle detection device, including: a part to be detected, being attached to an object to be detected for rotation position; a magnetism collecting plate, being disposed opposed to the part to be detected, having a magnetosensitive face, extending in parallel to a rotation surface of the part to be detected; a first magnetism sensing element, being disposed on a first detection axis, the first detection axis extending in parallel to the magnetosensitive face of the magnetism collecting plate and being orthogonal to the axial direction of the rotation axis of the object to be detected, for detection of a magnetic flux component in the extending direction of the first detection axis; a second magnetism sensing element, being disposed on a second detection axis, the second detection axis crossing the first detection axis, extending in parallel to the magnetosensitive face of the magnetism collecting plate and being orthogonal to the axial direction of the rotation axis, for detection of a magnetic flux component in the extending direction of the second detection axis; and a signal output unit for outputting a signal according to a rotation position of the object to be detected, based on a result of detection by the first magnetism sensing element and the second magnetism sensing element, wherein the part to be detected is disposed, the magnetic field generated from the part to be detected being biased from the rotation axis toward the extending direction of the rotation surface.

In another aspect of the present invention, the part to be detected is configured such that a magnet and a magnetic substance are arranged along the extending direction of the rotation surface, being connected to each other.

In another aspect of the present invention, the magnet has a gap forming portion for forming a gap between it and the magnetic substance at an edge portion where the magnet is to be connected to the magnetic substance.

In another aspect of the present invention, the part to be detected is formed of a magnet which is polarized such that one side and the other side thereof facing each other across the axis of the part to be detected direct the respective magnetic poles opposite to each other toward the rotation surface, the part to be detected being disposed with the axis thereof being displaced in the extending direction of the rotation surface with respect to the rotation axis.

Advantages of the Invention

In accordance with the present invention, the magnetic field generated from the part to be detected is biased in the extending direction of the rotation surface of the part to be detected, thereby the magnetic flux components detected by the magnetism sensing elements being biased, which allows the variation (in magnetic flux component) between the magnetism sensing elements to be filtered out. Thereby, it is possible to obtain a detection result which is less in error due to the differential detection, with the linearity in the output being assured in a wider rotation angle range.

BRIEF DESCRIPTION OF THE DRAWINGS

FIG. 3(a) is a plan view illustrating a positional relationship between the part to be detected and a Hall IC, while FIG. 3(b) is a figure showing the state of the magnetic flux detected by the Hall IC of the rotation position detection device in accordance with the present invention;

FIG. 4(a) is a figure showing the state of the magnetic flux to be detected by the Hall IC of the conventional rotation position detection device, while FIG. 4(b) is a figure showing the components of the magnetic flux of a disturbance magnetic field detected by the Hall IC;

FIG. 5(a) shows the conventional part to be detected and FIG. 5(b) is a diagram showing the linearity of the detection result with the conventional rotation angle detection device;

FIG. 6(a) shows the part to be detected in accordance with the present invention and FIG. 6(b) is a diagram showing the linearity of the detection result with the rotation angle detection device in FIG. 1;

FIGS. 7(a) and 7(b) show a first modification of the part to be detected;

FIGS. 8(a) and 8(b) show a second modification of the part to be detected;

FIGS. 9(a) and 9(b) show a third modification of the part to be;

BEST MODE FOR CARRYING OUT THE INVENTION

Figure 1:
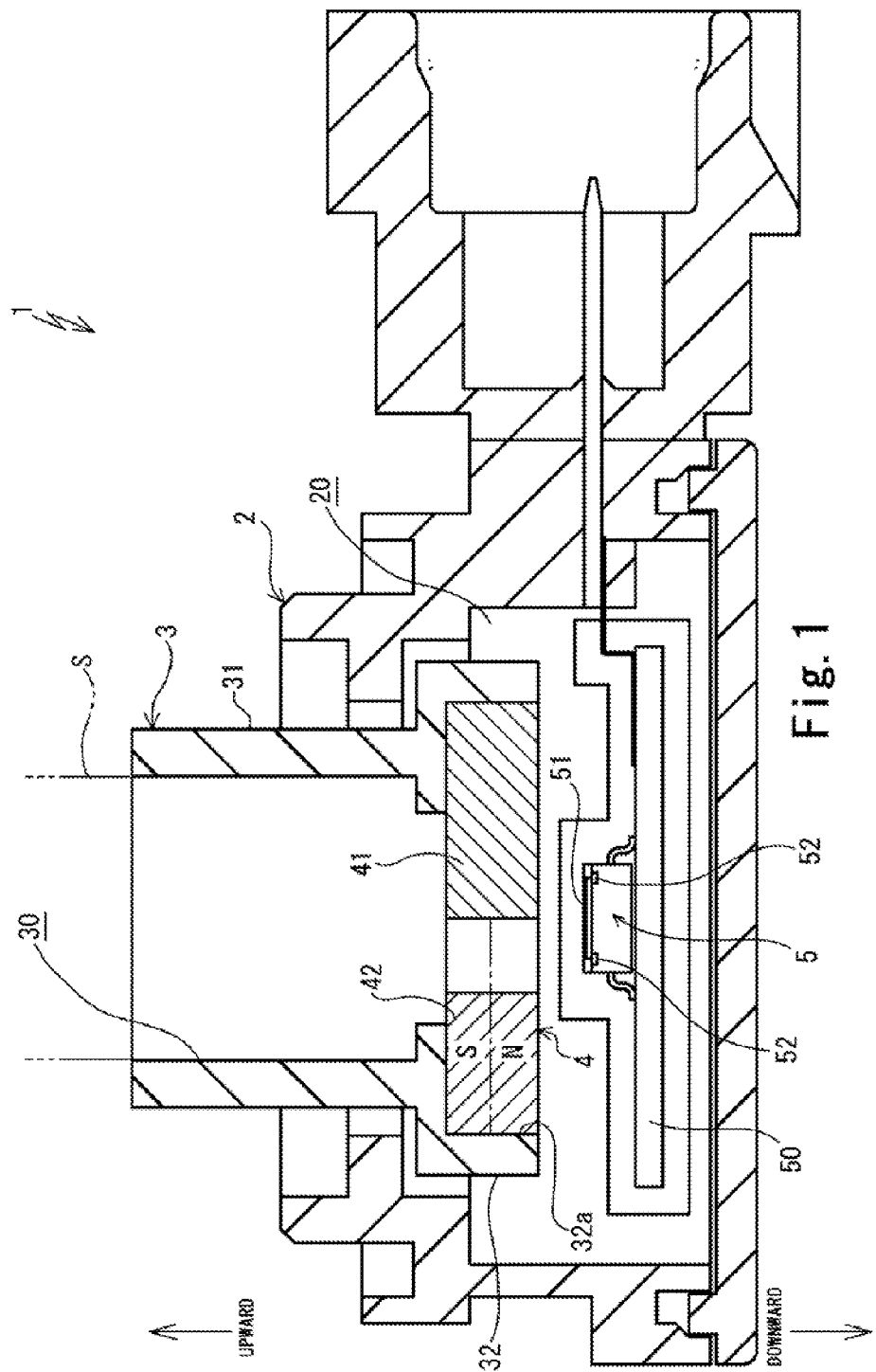
FIG. 1 is a sectional view showing a rotation angle detection device in one embodiment of the present invention.

Hereinbelow, one embodiment of the present invention will be explained with reference to the drawings. FIG. 1 is a sectional view showing a rotation angle detection device 1 according to the present embodiment. In FIGS. 1 to 4(b), the upward and downward directions are indicated. However, such indications are given only for explanation, and thus the upward and downward directions in those figures may be different from those in the actual disposition.

As shown in FIG. 1, the rotation angle detection device 1 includes a housing 2 which is attached to a throttle body (not shown) of a throttle apparatus, and a rotor 3 which is attached to a throttle shaft S of the throttle apparatus.

The rotor 3 has a rotor body 31 which is shouldered cylindrical, being loaded onto an end portion of the throttle shaft S, and a housing portion 32 which is formed in the lower end portion of the rotor body 31. The rotor body 31 is connected to the throttle shaft S by inserting the end portion of the throttle shaft S into an upper end opening portion of a fitting bore 30. The housing portion 32 has a housing chamber 32a which is opened at the bottom face thereof for housing the part to be detected 4.

The housing 2 has a housing chamber 20 which is opened at the top face thereof to house the rotor 3. In the housing chamber 20, a substrate 50 on which a magnetic field detection unit 5 is loaded is disposed in the axial direction of the rotation axis of the part to be detected 4. The magnetic field detection unit 5 is provided with a magnetism collecting plate 51 having a magnetosensitive face extending in parallel to a rotation surface of the part to be detected 4, and Hall elements 52 disposed on an axis which is in parallel to the magnetosensitive face of the magnetism collecting plate 51 and orthogonal to the axial direction of the rotation axis of the part to be detected 4. The magnetic field detection unit 5 is, for example, a Hall IC, extending a plurality of terminals from the side faces of the body in the shape of a square box, these terminals being connected to a circuit on the substrate 50.

Figure 2:
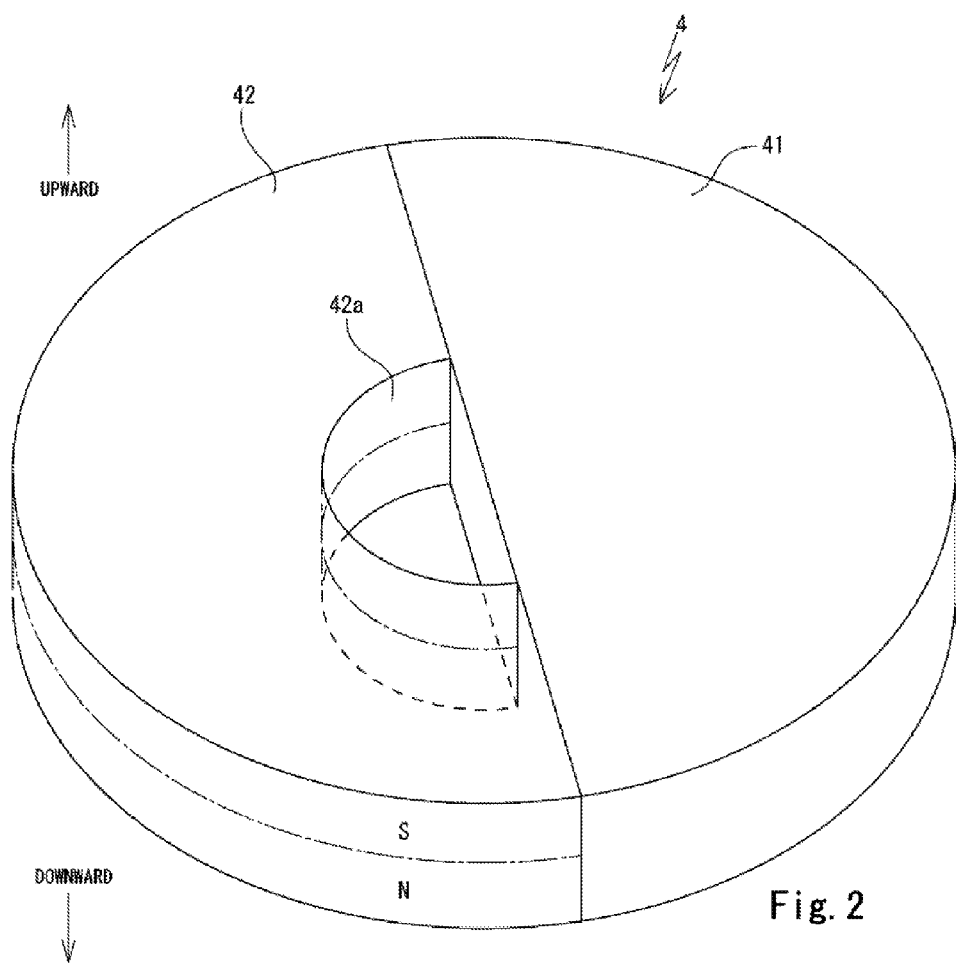
FIG. 2 is a perspective view showing a part to be detected of the rotation angle detection device.

As shown in FIG. 2, the part to be detected 4 is configured such that a yoke 41, which is a magnetic substance in the shape of a semicircular flat plate, and a magnet 42 in the shape of a semiannular flat plate, are attracted to each other to be in tight contact at the end faces extending linearly, being attraction-connected to each other by a magnetic force along the extending direction of the rotation surface (in the direction crossing the so-called rotation axis of the part to be detected 4). The yoke 41 may be of any magnetic substance, however, it is particularly preferable that the yoke 41 be made of a material having a high permeability. In the present embodiment, a ferrous material is used for the yoke 41. Between the yoke 41 and the magnet 42, a gap is provided by a gap forming portion 42a, which is formed in the linear edge portion of the magnet 42. The part to be detected 4, which is housed in the housing chamber 32a, is disposed such that the axis of the part to be detected 4 coincides with the axis of the throttle shaft S, and in accordance with the rotation of the throttle shaft S, is rotated around the axis of the part to be detected 4.

Figure 3A:
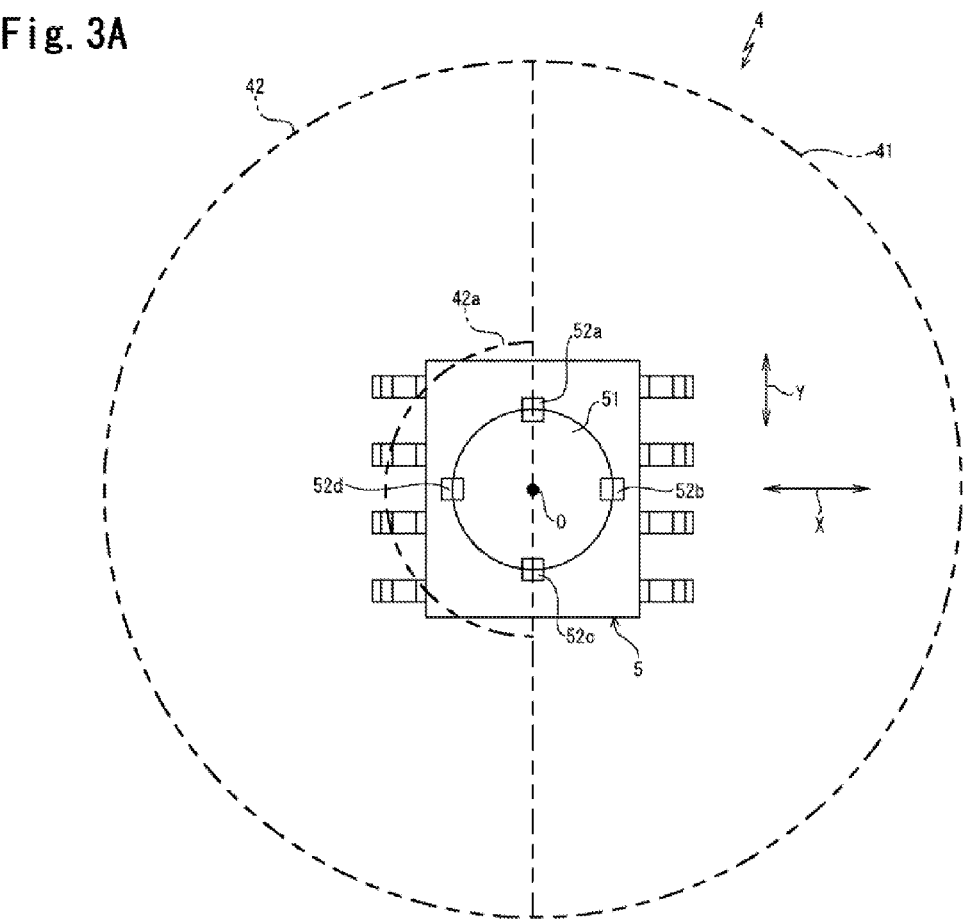

As shown in FIG. 3(a), in the Hall IC 5, which is a magnetic field detection unit, there are provided four Hall elements 52, which are Hall elements 52a to 52d serving as magnetism sensing elements. Hereinbelow, the X-axis direction and the Y-axis direction are indicated in FIG. 3(a), however, they are given only for explanation, and thus may be different from the X-axis direction and the Y-axis direction in the actual disposition. In addition, on the Hall IC 5, there is loaded a magnetism collecting plate 51 which provides a disk-shaped magnetosensitive face in parallel to the rotation surface of the part to be detected 4. The Hall elements 52a to 52d are annularly disposed around the center O of the magnetism collecting plate 51, with the center portions of the Hall elements 52a to 52d being located on the peripheral edge of the magnetism collecting plate 51. The Hall elements 52a, 52c are disposed opposed to each other across the center O, being arranged in the Y-axis direction (the first detection axis or the second detection axis) with each being provided with an equal spacing from the center O. The Hall elements 52b, 52d are disposed opposed to each other across the center O, being arranged in the X-axis direction (the second detection axis or the first detection axis) with each being provided with an equal spacing from the center O. The Hall IC 5 is disposed opposed to the bottom face of the part to be detected 4 with the top face of the magnetism collecting plate 51 facing the part to be detected 4 such that the center O of the magnetism collecting plate 51 coinciding with the rotation axis of the part to be detected 4.

Next, the detection method with the Hall IC 5 will be explained. FIG. 4(a) shows the state of the magnetic flux which is applied to the Hall IC 5 in the conventional rotation angle detection device. As shown in FIG. 4(a), the Hall IC 5 detects the X component Bx of the applied magnetic flux in the extending direction of the X-axis, and the Y component By of the applied magnetic flux in the extending direction of the Y-axis by means of the magnetism collecting plate 51, converting them into the Z components in the rotation axis of the part to be detected 4, and detecting them as a magnetic flux component B1 with one Hall element 52, and as a magnetic flux component B2 with the other Hall element 52, together with the Z component Bz (Bz1, Bz2) of the applied magnetic flux in the Z-axis direction (the axial direction of the rotation axis). Therefore, the magnetic flux component B1, B2 is expressed as:

$$B1 = B\perp + Bz$$

$$B2 = -B\perp - Bz = -(B\perp + Bz)$$

$$|B1| = |B2|$$

and the value being in proportion to the magnitude of the applied magnetic field.

In these expressions, the symbol $B\perp$ denotes the magnetic flux component obtained as a result of conversion of the X component Bx or the Y component By into the Z component.

As shown in FIG. 3(a), the Hall IC 5 is provided with four Hall elements 52a to 52d, and a signal output unit incorporated in the Hall IC 5 computes the Y component By containing the Z component Bz on the basis of the difference between the magnetic flux component B1 and the magnetic flux component B2 which have been detected by the Hall element 52a and the other Hall element 52c, respectively, and the X component Bx containing the Z component Bz on the basis of the difference between the magnetic flux component B1 and the magnetic flux component B2 which have been detected by the Hall elements 52b, 52d, respectively. Here, the Bx and By can be expressed as follows:

$$Bx = B1 - B2 = 2B\perp x + 2Bz$$

$$By = B1 - B2 = 2B\perp y + 2Bz$$

In these expressions, the symbol $B\perp x$ denotes the magnetic flux component as a result of conversion of the X component Bx into the Z component, while the symbol $B\perp y$ the magnetic flux component as a result of conversion of the Y component By into the Z component.

And, the signal output unit identifies the rotation position of the part to be detected 4, using the center o as the reference, on the basis of the ratio between the X component Bx and the Y component By which have been computed, and outputs a signal in accordance with the rotation position. At this time, the X component Bx and the Y component By actually contain the Z component Bz, respectively, however, the Z component Bz contributes to both of the X component Bx and the Y component By in the same manner, thereby having no effect on the detection value.

FIG. 4(b) represents the state of the magnetic flux in the case where there exists a disturbance magnetic field which is different from the magnetic field applied by the magnet of the part to be detected. When the disturbance magnetic field is applied, in the Z-axis direction, to the Hall elements 52b, 52d which are disposed along the X-axis direction, a Z component Bz' of the magnetic flux along the Z-axis direction is generated in the Hall elements 52b, 52d. The Z component Bz' of the magnetic flux that is generated is detected by the Hall elements 52b, 52d s that in the same direction, and therefore, by carrying out a differential operation on the magnetic flux component B1 and the magnetic flux component B2 as expressed by the following expressions, the effect of the disturbance magnetic field by the Z component Bz' can be cancelled.

$$Bx = B1 - B2 = B\perp x + Bz + Bz' - (-B\perp x - Bz + Bz') = 2B\perp x + 2Bz$$

$$By = B1 - B2 = B\perp y + Bz + Bz' - (-B\perp y - Bz + Bz') = 2B\perp y + 2Bz$$

Figure 5A:
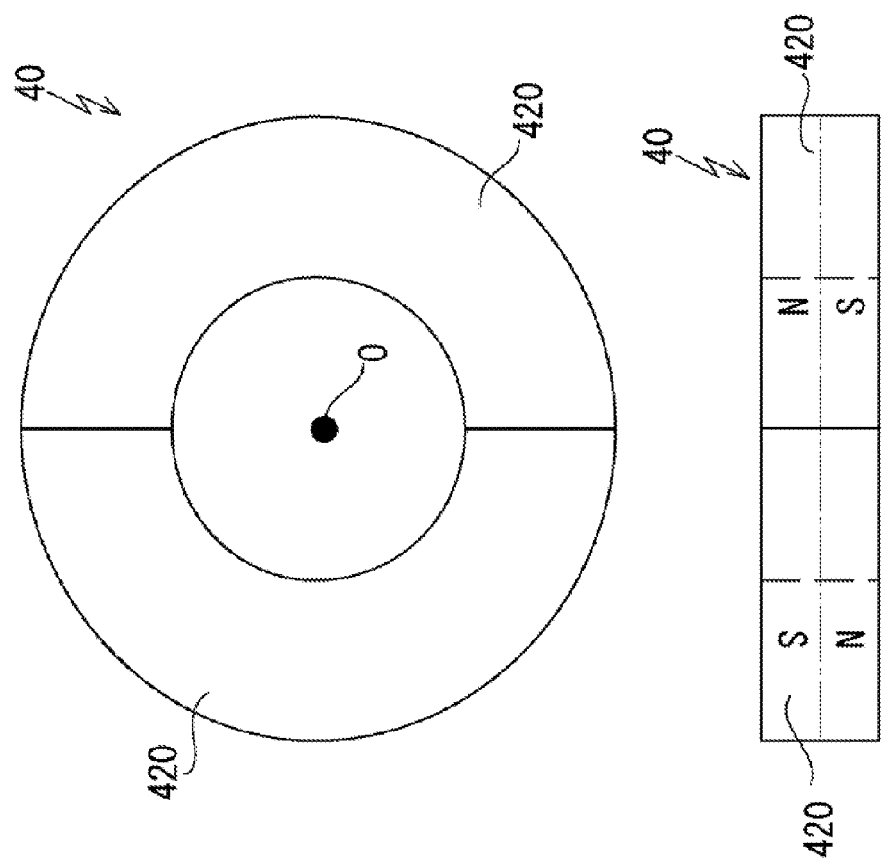

FIG. 5(a) is a figure showing a part to be detected 40 in the shape of an annulus that is formed by combining two semi-annular magnets 420 with each other, being used in the conventional rotation angle detection device, while FIG. 5(b) is a diagram showing the linearity of the detection result for the rotation angle with the rotation angle detection device using the above conventional part to be detected 40. FIG. 6(a) shows the part to be detected 4 in accordance with the present invention, which is configured by connecting the linearly extending end face of the yoke 41 in the shape of a semicircular flat plate with that of the magnet 42 in the shape of a semiannular flat plate. FIG. 6(b) is a diagram showing the linearity of the detection result for the rotation angle with the rotation angle detection device 1 using the part to be detected 4.

The linearity as shown in FIG. 5(b), FIG. 6(b) indicates a deviation of the detection result actually obtained when the part to be detected 40, 4 was rotated in a clockwise direction around the center O from the state of 0 deg shown in FIG. 5(a), FIG. 6(a) in relation to the actual rotation angle of the part to be detected 40, 4. The linearity indicates to what extent the actual measurement differs from the projected value, the curve in the diagram indicating that, at 0%, the actual measurement coincides with the projected value, and that the further it deviates from the 0% line, the larger the deviation of the actual measurement from the projected value. The detection result with the Hall IC 5 should essentially be linearly changed in proportion to the rotation angle of the part to be detected 40, 4 over 0 deg to 360 deg, however, the actual detection result exhibits a deviation (error) with respect to this ideal linearity.

With the conventional rotation angle detection device, the linearity as a detection result exhibits an undulation having an oscillatory period of 180 deg as shown in FIG. 5(b). Contrarily to this, the linearity as a detection result with the rotation angle detection device 1 exhibits an undulation having an oscillatory period of 360 deg as shown in FIG. 6(b) when the part to be detected 4 is rotated one turn (through an angle of 360 deg).

With the differential detection method as described above, the effect of the disturbance magnetic field can be suppressed, however, since a pair of Hall elements are used to detect the magnetic field components, such a factor as a difference in position or sensitivity between the Hall elements generates a variation in detection between the Hall elements, resulting in the linearity exhibiting an undulation which oscillates at a narrow period. When the linearity has an undulation, it is difficult to perform the rotation angle detection with high accuracy. Further, in the case where there is produced a periodical undulation, it is possible to compensate for the deviation in the range between the high and low of the undulation in which the linearity is linearly changed, however, in such case, the angle range where the rotation angle can be detected will be limited.

With the rotation angle detection device 1 in accordance with the present embodiment, the part to be detected 4 is configured by combining the semiannular magnet 42 with the semicircular yoke 41, thereby the magnetic field generated from the part to be detected 4 is biased from the center O toward the extending direction of the rotation surface of the part to be detected 4. The state of the magnetic flux applied to the Hall IC 5 in this configuration is shown in FIG. 3(b).

The Z component Bz (Bz1, Bz2) of the magnetic flux in the Z-axis direction (the axial direction of the rotation axis) that is applied to the Hall element 52 is applied to the pair of Hall elements 52 (the Hall elements 52b, 52d disposed along the X-axis direction) as the magnetic flux with which the magnetic flux components Bz1, Bz2 are in the same direction. Therefore, the magnetic flux components B1, B2 detected by the Hall element 52b, 52d are expressed by:

$$B1 = B\perp - Bz1$$

$$B2 = -B\perp - Bz2 = -(B\perp + Bz2)$$

$$|B1| - |B2| = |Bz1 + Bz1|$$

and between the magnetic flux components B1 and B2, there occurs a difference in magnitude of magnetic flux of (Bz1+Bz2).

As can be seen from FIG. 4(a), with the conventional rotation angle detection device, the magnetic flux components B1 and B2 differ from each other in direction in which the magnetic flux acts, but are the same in magnitude of magnetic flux. However, with the rotation angle detection device 1 according to the present embodiment, the magnetic flux components acting in the Z-axis direction are biased in one direction, and further they are different from each other in magnitude of magnetic flux, thereby a difference being produced between the magnitudes of the magnetic flux components B1, B2 which are detected by the pair of Hall elements 52 (52b, 52d). This difference (Bz1+Bz2) between the magnetic flux components B1, B2 is greater than the magnitude of the magnetic flux component resulting from the detection variation between the Hall elements 52.

The magnetic flux component Bx (or By) detected by the pair of Hall elements 52 is detected containing the difference magnetic flux component between the magnetic flux components B1 and B2 and the magnetic flux component resulting from the detection variation between the Hall elements 52. Therefore, the detection variation between the Hall elements 52 is filtered out by the difference magnetic flux component between the magnetic flux components B1 and B2, resulting in the undulation being eliminated.

The difference magnetic flux component between the magnetic flux components B1 and B2 is expressed as (Bz1+Bz2), however, this magnetic flux component will contribute to the detection for either the X-axis or the Y-axis in the same manner. Therefore, with the rotation position detection device 1 which identifies the rotation position of the part to be detected 4 on the basis of the ratio between the X component Bx and the Y component By which have been computed, the difference magnetic flux component (Bz1+Bz2) will not be directly influenced by the detection value until the direction in which the magnetic flux acts is changed. Therefore, the undulation of the linearity at a narrow period that has conventionally been produced by such a cause as the detection variation between the Hall elements 52 can be eliminated.

Also in the present embodiment, in the rotation range where the direction in which the magnetic flux acts is changed, an undulation having a great period will be produced, however, in a wider angle range, the angle can be detected with accuracy. Therefore, the range where the linearity as a detection result with the rotation angle detection device 1 gets near to a straight line is widened, thereby a detection result with high accuracy can be obtained in a wider rotation angle range.

In other words, with the conventional rotation angle detection device, the linearity is linearly changed in the range of approx. 90 deg between the high and low of the undulation, thereby in the range of angle below the above 90 deg (for example, the range of angle a to angle b), the deviation of the detection result can be easily corrected in detecting the rotation angle. With the rotation angle detection device 1 according to the present embodiment, the linearity is linearly changed in the range of approx. 180 deg between the high and low of the undulation, thereby in the range of angle below the above 180 deg (for example, the range of angle c to angle d), the deviation of the detection result can be easily corrected in detecting the rotation angle. As described above, with the rotation angle detection device 1 according to the present embodiment, the linearity in the output can be obtained in a range of rotation angle double as wide as that with the conventional rotation angle detection device, and thus the rotation angle can be detected in a range double as wide, whereby the rotation angle detection device 1 can be used for an increased number of applications where the rotation angle is to be detected.

In the above embodiment, the case where the part to be detected 4 is configured by combining the semiannular magnet 42 with the semicircular yoke 41 has been explained, however, the configuration of the part to be detected 4 is optional, provided that the magnetic field generated from the part to be detected 4 is biased from the center O toward the extending direction of the rotation surface of the part to be detected 4.

Figure 9A:
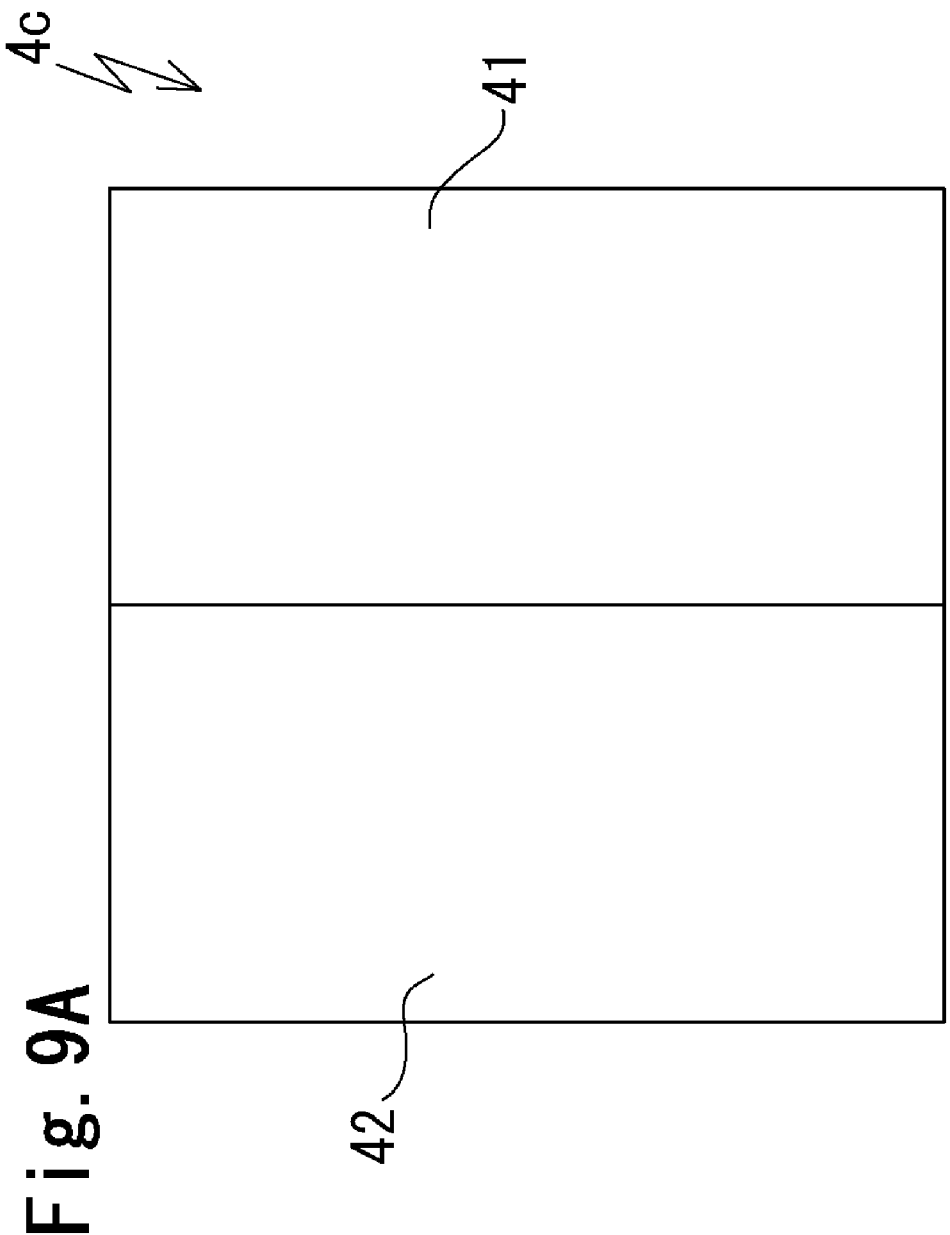
Figure 10A:
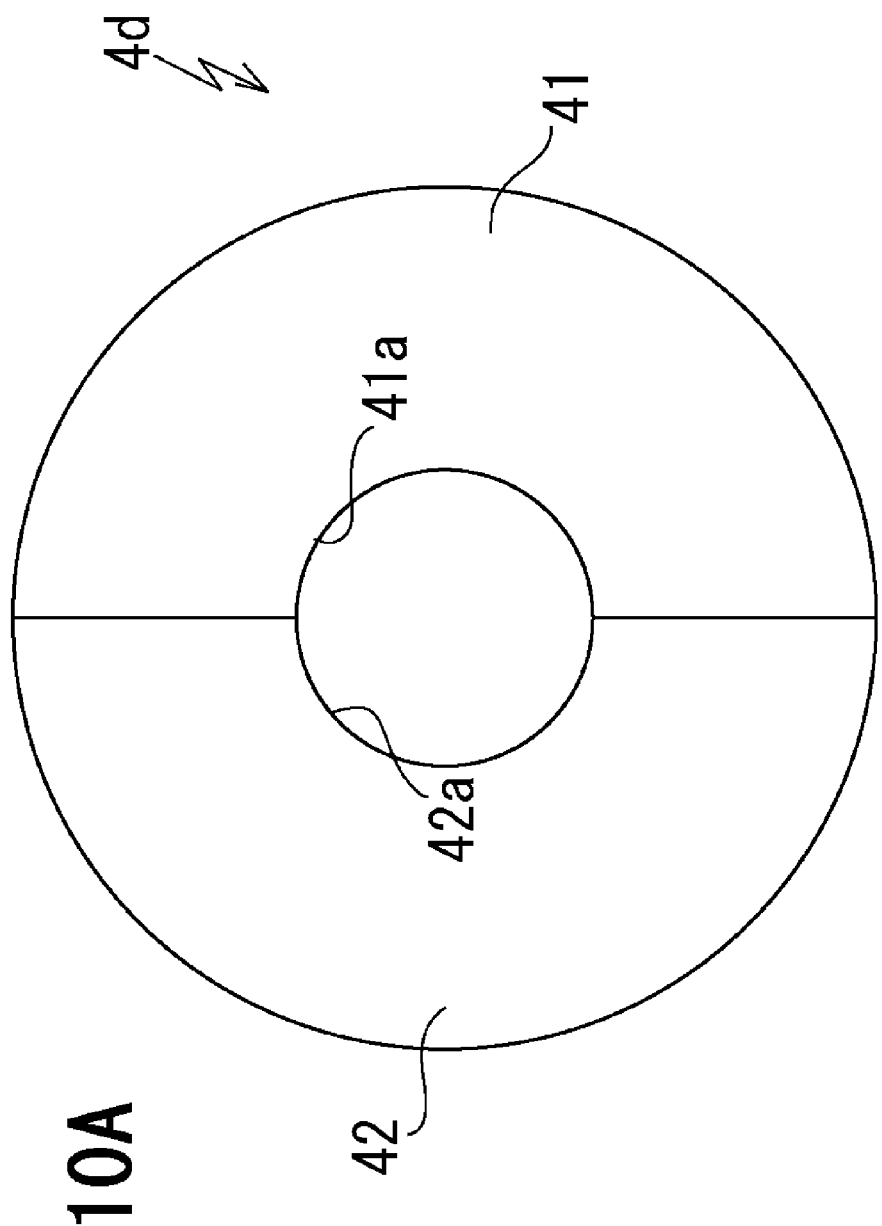
FIGS. 10(a) and 10(b) show a fourth modification of the part to be detected.
Figure 10B:
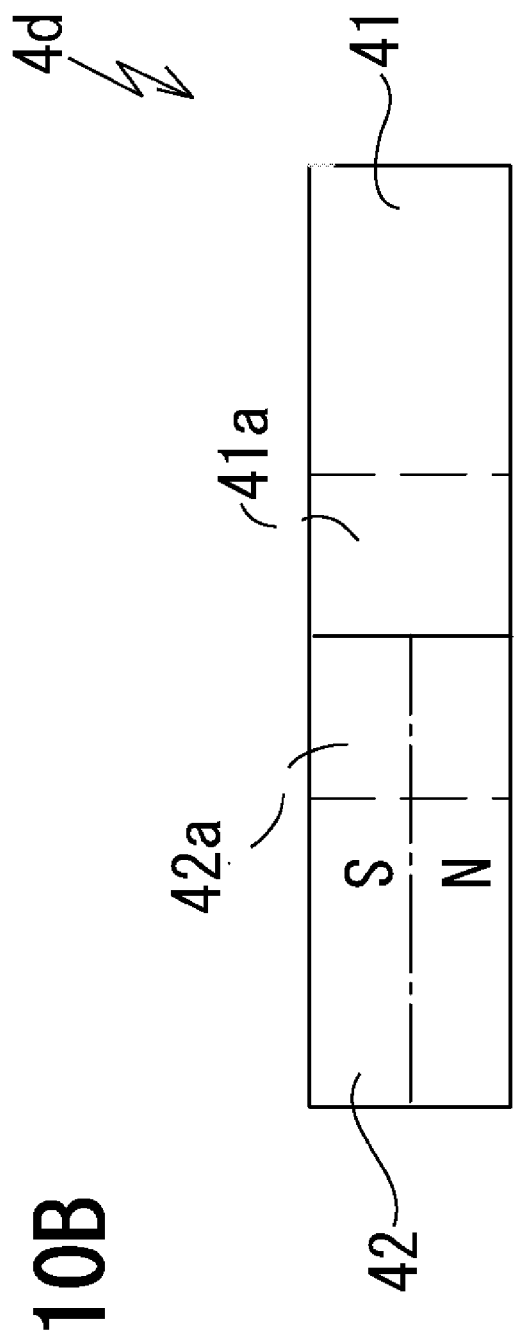
Figure 11A:
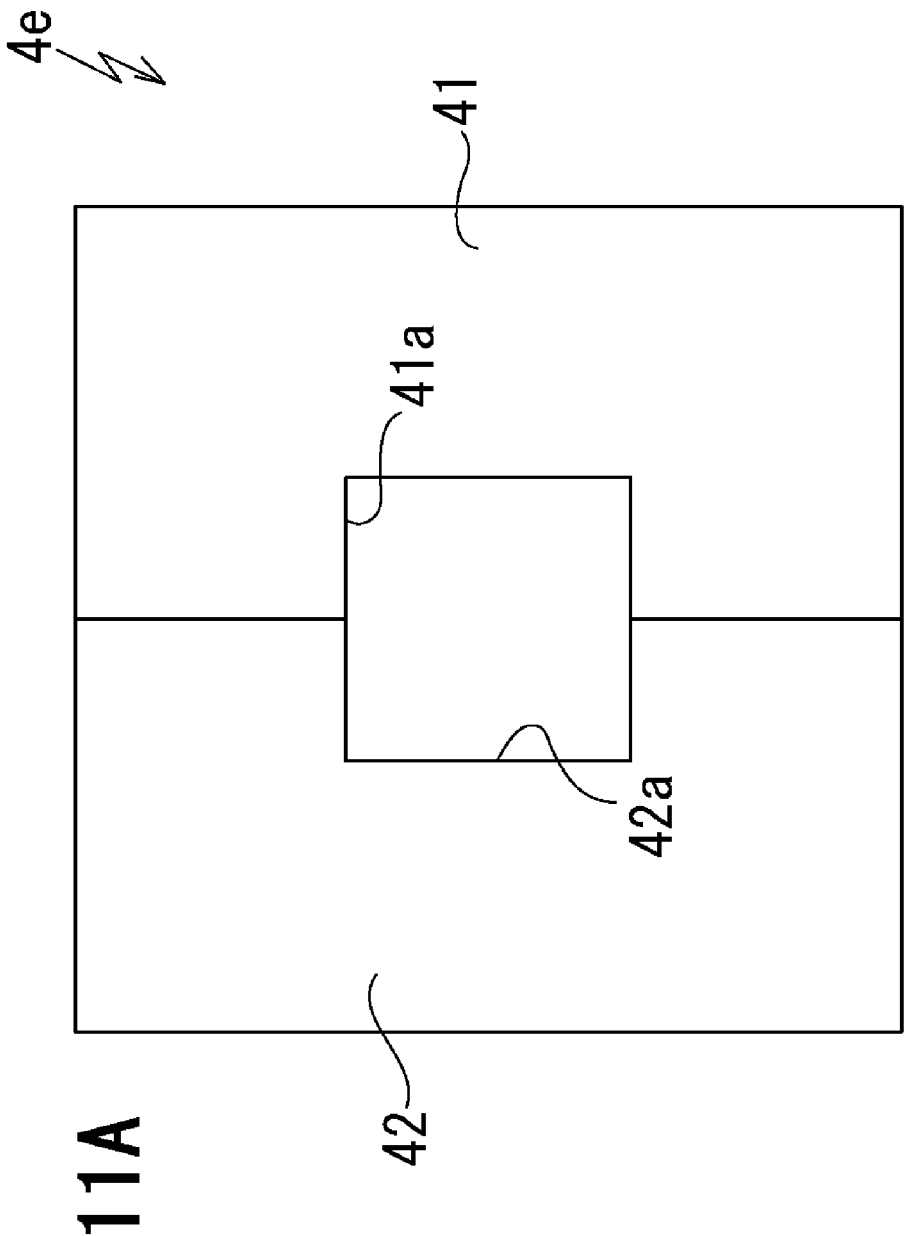
FIGS. 11(a) and 11(b) show a fifth modification of the part to be detected.
Figure 11B:
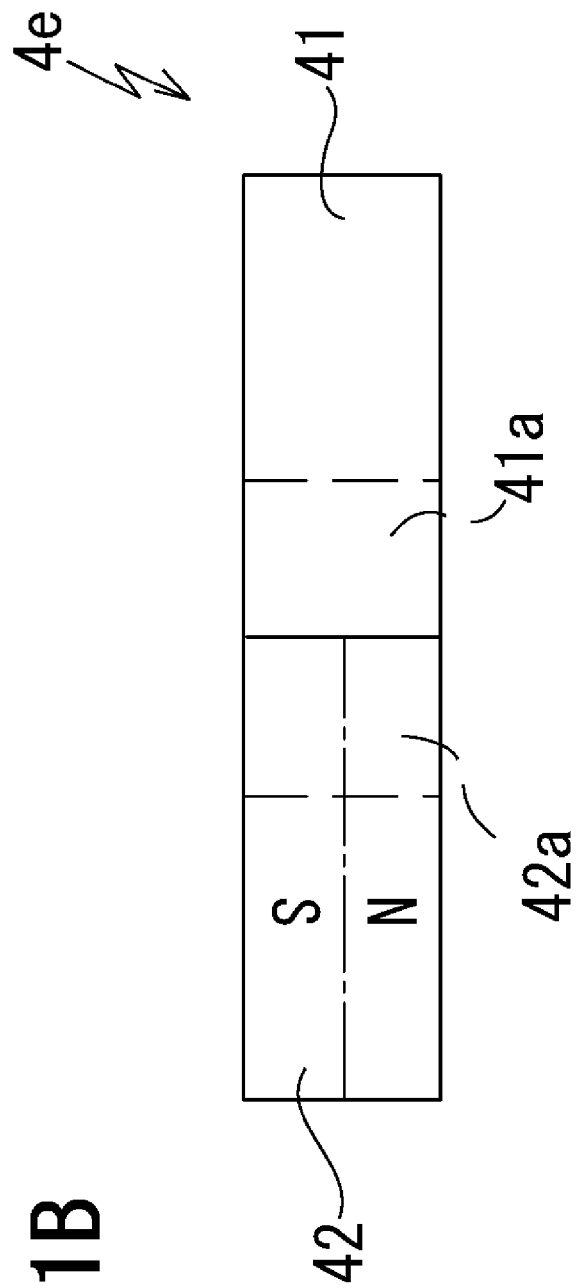

For example, like a part to be detected 4a shown in FIGS. 7(a) and 7(b), the magnet 42 in the shape of the letter U may be combined with a rectangular yoke 41. Further, like a part to be detected 4b shown in FIGS. 8(a) and 8(b), the yoke 41 and the magnet 42 which are both semicircular may be combined with each other. Further, like a part to be detected 4c shown in FIGS. 9(a) and 9(b), the yoke 41 and the magnet 42 which are both rectangular may be combined with each other. Further, like a part to be detected 4d shown in FIGS. 10(a) and 10(b), the yoke 41 and the magnet 42 which are both semiannular may be combined with each other. Further, like a part to be detected 4e shown in FIGS. 11(a) and 11(b), the yoke 41 and the magnet 42 which are both in the shape of the letter Π may be combined with each other.

Further, provided that the magnetic field generated from the part to be detected 4 is biased from the center O, serving as the reference for detection of the rotation angle in the Hall IC 5, toward the extending direction of the rotation surface of the part to be detected 4, the part to be detected 4 may be formed of a magnet which is polarized such that one side and the other side thereof facing each other across the axis of the part to be detected 4 direct the respective magnetic poles opposite to each other toward the rotation surface. For example, the part to be detected 4 may be configured by combining the magnets 42 having the same shape, with the axis of the part to be detected 4 being displaced in the extending direction of the rotation surface with respect to the center O.

Further, in the above embodiment, the case where the part to be detected 4 is fixed to the throttle shaft S by means of the rotor 3 has been explained, however, provided that the part to be detected 4 is rotated integrally with the throttle shaft S, the method of fixing the part to be detected 4 to the throttle shaft S is optional, and the part to be detected 4 may be directly fixed to the throttle shaft S. In addition, in the above embodiment, the case where the present invention is applied to the rotation angle detection device 1 for detecting the rotation angle of the throttle shaft S has been explained, however, the detection object to which the rotor is to be attached is optional.

DESCRIPTION OF SYMBOLS

Reference symbol 1 denotes rotation angle detection device; 2 housing, 20 housing chamber; 3 rotor; 30 fitting bore; 31 rotor body; 32 housing portion; 32*a* housing chamber; 4, 4*a* to 4*e*, 40 part to be detected; 41 yoke; 42, 420 magnet; 42*a* gap forming portion; 5 magnetic field detection unit (Hall IC); 50 substrate; 51 magnetism collecting plate; 52, 52*a* to 52*d* Hall element; Bx X component of magnetic flux; By Y component of magnetic flux; Bz (Bz1, Bz2), Bz' Z component of magnetic flux; B1 magnetic flux component; B2 magnetic flux component; and S throttle shaft.

The invention claimed is:

1. A rotation angle detection device, comprising:
 a part to be detected, being attached to an object to be detected for rotation position;
 a magnetism collecting plate, being disposed opposed to the part to be detected, having a magnetosensitive face, extending in parallel to a rotation surface of said part to be detected;
 a first magnetism sensing element, being disposed on a first detection axis, the first detection axis extending in parallel to the magnetosensitive face of the magnetism collecting plate and being orthogonal to the axial direction of the rotation axis of said object to be detected, for detection of a magnetic flux component in the extending direction of the first detection axis;
 a second magnetism sensing element, being disposed on a second detection axis, the second detection axis crossing the first detection axis, extending in parallel to the magnetosensitive face of said magnetism collecting plate and being orthogonal to the axial direction of said rotation axis, for detection of a magnetic flux component in the extending direction of the second detection axis; and
 a signal output unit for outputting a signal according to a rotation position of said object to be detected, based on a result of detection by said first magnetism sensing element and said second magnetism sensing element,
 wherein said part to be detected is configured such that one half of said part to be detected comprises a magnet having respective magnetic poles and the other half of said part to be detected comprises a yoke made of a non-polarized, permeable material, such that the magnet and the yoke are arranged along the extending direction of said rotation surface, being connected to each other, and
 wherein the magnetic field generated from said part to be detected is biased from said rotation axis toward the extending direction of said rotation surface.

2. The rotation angle detection device according to claim 1, wherein said magnet has a gap forming portion for forming a gap between said magnet and said yoke at an edge portion where said magnet is to be connected to said yoke.

3. The rotation angle detection device according to claim 1, wherein said part to be detected is formed of a magnet which is polarized such that one side and the other side thereof facing each other across the axis of the part to be detected direct the respective magnetic poles opposite to each other toward said rotation surface, said part to be detected being disposed with the axis thereof being displaced such that the magnet is displaced in the extending direction of said rotation surface with respect to said rotation axis.

* * * * *